US012105839B2

(12) United States Patent
Ghatage et al.

(10) Patent No.: US 12,105,839 B2
(45) Date of Patent: Oct. 1, 2024

(54) ENABLING SECURE ACCESS TO APPLICATIONS VIA SOCIAL MEDIA

(71) Applicant: ACCENTURE GLOBAL SOLUTIONS LIMITED, Dublin (IE)

(72) Inventors: Prakash Ghatage, Bangalore (IN); Kaustubh Kurhekar, Pune (IN); Naveen Kumar Thangaraj, Salem (IN); Kumar Viswanathan, San Jose, CA (US); Sreevidya Prasad, Bangalore (IN); Nirav Jagdish Sampat, Mumbai (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 193 days.

(21) Appl. No.: 17/679,952

(22) Filed: Feb. 24, 2022

(65) Prior Publication Data

US 2023/0267227 A1 Aug. 24, 2023

(51) Int. Cl.
*G06F 21/62* (2013.01)
(52) U.S. Cl.
CPC .................. *G06F 21/6245* (2013.01)
(58) Field of Classification Search
CPC .................................................. G06F 21/6245
See application file for complete search history.

(56) References Cited

U.S. PATENT DOCUMENTS

| 9,778,820 | B2 * | 10/2017 | Desai ................... G06F 3/0482 |
| 9,923,327 | B2 * | 3/2018 | Packebusch ............ B25B 27/10 |
| 2015/0339486 | A1 * | 11/2015 | Shetye ................... H04L 67/02 726/28 |
| 2018/0285413 | A1 * | 10/2018 | Vora ...................... G06F 16/245 |
| 2018/0357410 | A1 * | 12/2018 | Chandrasekaran ......................... H04L 63/0861 |
| 2019/0079782 | A1 * | 3/2019 | Goldberg .............. H04L 67/535 |
| 2020/0314133 | A1 * | 10/2020 | Singh .................... G06F 21/604 |
| 2021/0049249 | A1 * | 2/2021 | Falardeau ............... G06F 21/32 |
| 2021/0409357 | A1 * | 12/2021 | Brody ................... H04L 51/216 |

\* cited by examiner

*Primary Examiner* — Viet D Vu
(74) *Attorney, Agent, or Firm* — Mannava & Kang, P.C.

(57) ABSTRACT

An authentication and applications access system provides access to a plurality of backend applications via a social media application installed on a user device. Metadata associated with a request to access one of the plurality of backend applications is initially extracted. The metadata is used to authenticate the request via a plurality of validation steps. Upon authentication, the information from the request is provided to the backend application to receive the results responsive to the request. Any sensitive data included in the results is suppressed via data substitution steps from the transmission to the user device. The output from the applications access system with the sensitive data occluded is provided for display on a social media user interface (UI) on a user device.

17 Claims, 13 Drawing Sheets

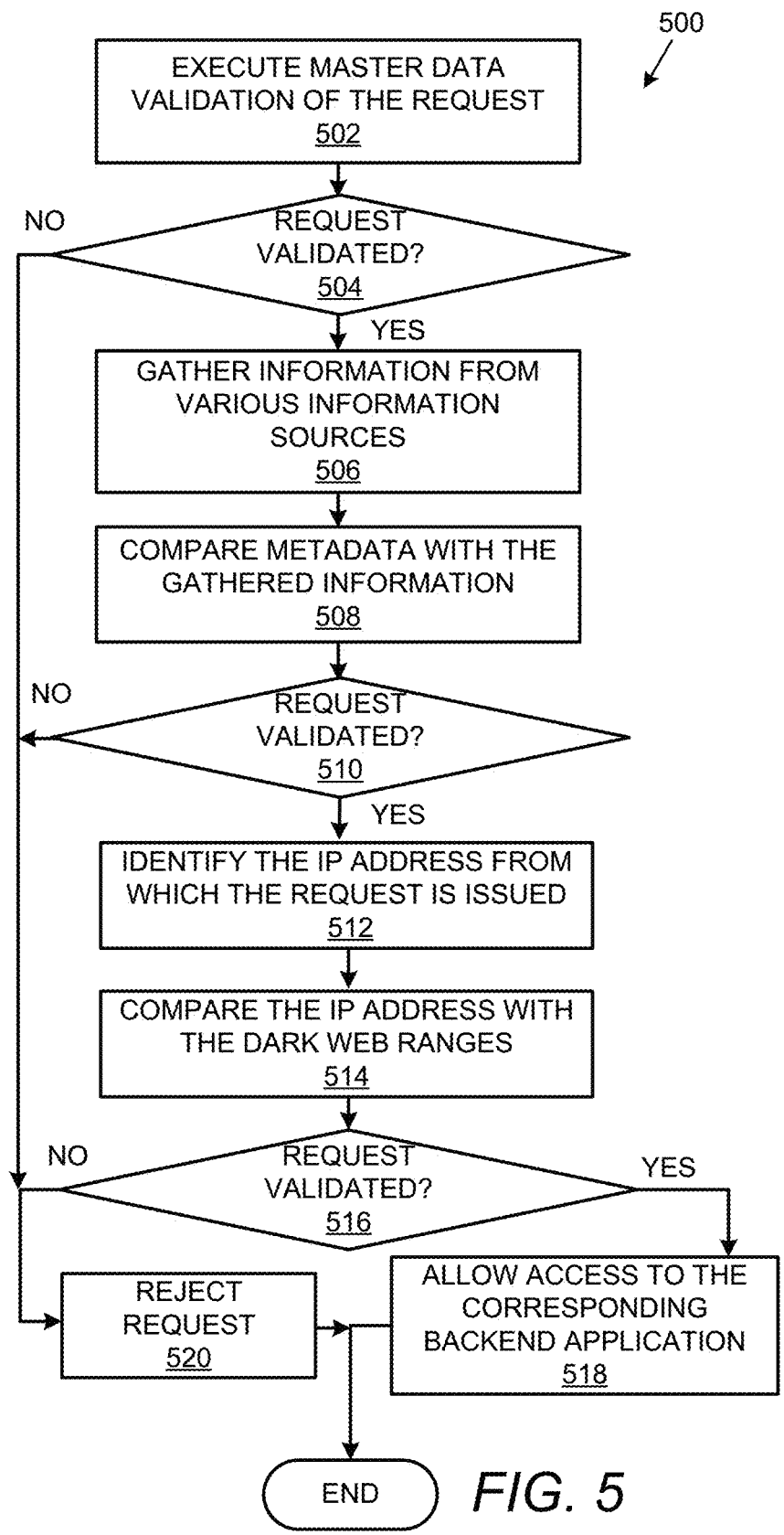

ENABLING SECURE ACCESS TO APPLICATIONS VIA SOCIAL MEDIA

BACKGROUND

Social media applications are interactive web-based applications that enable users to create and share content with other users. Users can also create specific, purpose-bunt profiles which are maintained on the social media application platform to enable users to interact with other users of the social media application. The user profiles facilitate users to interact with each other by identifying other users with similar interests, exchanging/sharing content, opinions of the content, participating in group activities with other users, etc. Social media applications operate in a dialogic transmission system i.e., many sources to many receivers. Social media can help improve a person's connectedness with the real-world and/or online communities, New uses are being discovered each day for social media platforms to improve the value proposition that social media applications afford their users.

BRIEF DESCRIPTION OF DRAWINGS

Features of the present disclosure are illustrated by way of examples shown in the following figures. In the following figures, like numerals indicate like elements, in which:

FIG. 5 shows a flowchart that details the plurality of validation steps executed to validate a request in accordance with the examples disclosed herein.

DETAILED DESCRIPTION

Figure 1:
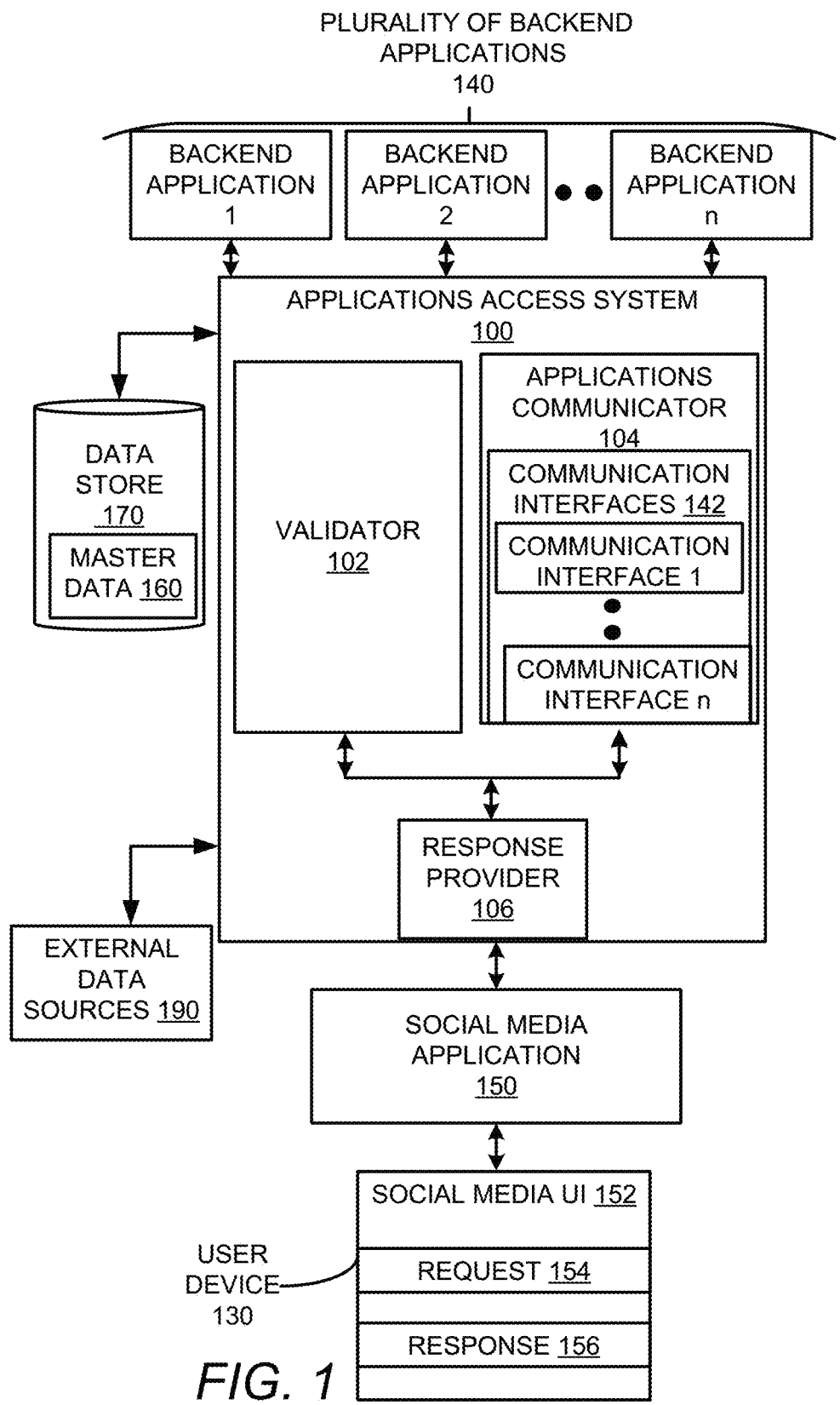
FIG. 1 shows a block diagram of an authentication and applications access system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An authentication and applications access system is disclosed which enables users to access one or more of a plurality of backend applications via a social media application. The plurality of backend applications are disparate from the social media application and can include applications that users may need to access to carry out certain tasks as outlined herein. The social media application can include any web-based application that supports information publication and sharing, building personal profiles, connecting to a community of users, and searching within the community. In an example, the applications access system enables a user to interact with a backend application via the social media UI in a manner similar to the user's interaction with other users. Authenticated users are permitted to issue requests to the backend application(s) and receive responses from the backend application(s) via the social media UI.

The request for access to a backend application can be initially received by the applications access system via the social media UI. In an example, the backend application(s) can be accessed via the social media UI as a user would access other social contacts, for example, via selecting the backend application from a listing of the social contacts/applications. The request to the backend application can be issued in a natural language. The request can be parsed, and tokenized to extract the metadata. Furthermore, certain metadata associated with the request can also be obtained via the application programming interfaces (APIs) of the social media application. A plurality of validation steps can be implemented serially, for example, using the metadata to validate the request. The metadata can include user authentication data associated with an authentic user account of the social media application, wherein the authentic user account is permitted access to one or more backend applications via the social media application.

A master data validation step can be initially implemented wherein metadata such as but not limited to, the base geographical location from which the request was issued, the user information associated with the request, etc., are initially verified. In an example, the master data validation can be based on the master data provided to the applications access system by the backend application. When the request is successfully validated using the master data validation, a further information validation step can be implemented using the information available in the public domain. For example, the backend application can be associated with an entity that authorizes the user's access. The information validation step can include gathering information regarding the entity using techniques such as web scraping or using official online information resources of the entity One or more pieces of information from the metadata can be verified using the information gathered from the online resources using an information-gathering step. Finally, the Internet Protocol (IP) address filtration step is implemented wherein the IP address of the request is verified with the dark web address ranges to determine that the request is not being issued from unauthorized users.

The request thus validated is provided by the applications access system to a corresponding backend application. The results or response to the request from the corresponding backend application is received by the applications access system and analyzed to identify any sensitive data included therein. Sensitive data can include any data that the applications access system is configured to prevent from being displayed on the social media UI in response to the request. The applications access system can implement multiple identification techniques to identify such sensitive data. The sensitive data thus identified is occluded or prevented from being displayed on the social media UI via different data substitution steps which can include but are not limited to, redaction, masking, pseudonymizing, and hashing.

The applications access system described herein improves the functionality of web-based social media applications by enabling secure access to one or more of the plurality of backend applications via the social media application. Generally, backend applications can only be accessed via their specific user interfaces. Furthermore, each backend application can implement a particular security protocol to allow authenticated access to users. As a result, a user may need to separately access each of the plurality of backend applications via their respective credentials. By enabling access to the plurality of backend applications via the social media application, the applications access system improves the ease of access by providing a single centralized gateway for multiple backend applications. However, at the same time, the security is not compromised as multiple validation steps are implemented. Thus, the applications access system makes use of the ease of access afforded by social media applications while maintaining strong security through the plurality of validation steps that prevent access of the backend applications by unauthorized users.

FIG. 1 shows a block diagram of an authentication and applications access system 100 in accordance with the examples disclosed herein. The applications access system 100 is communicatively coupled to a social media application 150 which is accessible to users via a social media user interface (UI) 152. In an example, a user can employ a user device 130 to access the social media application 150 via the social media UI 152. Examples of social media applications can include chatting and messaging application such as but are not limited to, Facebook®, Twitter®, Signal®, Telegram®, Whatsapp®, etc. While the social media platforms listed herein permit users to exchange content including images, audio, video, and data files the applications access system 100 disclosed herein enables users access to a plurality of backend applications 140, to retrieve, update or otherwise interact with the data on the backend applications 140. In accordance with the examples disclosed herein, the social media UI 152 can include a chat interface of an instant messenger (IM) application. The user may issue a request 154 via the social media UI 152 to the applications access system 100 to access one or more of the plurality of backend applications 140 which can include backend application 1, backend application 2, . . . , and backend application n. In an example, at least a subset of the plurality of backend applications 140 can be applications belonging to an application suite hosted on the same server. In some examples, the plurality of backend applications 140 can be hosted on disparate servers which may be remote from each other, and the applications access system 100. Examples of backend applications 140 can include but are not limited to, enterprise resource planning (ERP) systems, invoice processing applications, document management systems, eProcurement systems such as Ariba®, etc., notification applications, recommendation engines, help desk applications including ticketing tools such as Service Now, live and offline agent chat applications, such as MS Teams®, Bold 360®, etc.

The applications access system 100 can establish a channel/account on the social media application 150 to exchange communications with users who require access to one or more of the plurality of backend applications 140. Furthermore, the user employing the user device 130 may be authorized to access a subset of the plurality of backend applications 140 by an entity owning the access rights thereto. Each of the plurality of backend applications 140 can provide the applications access system 100 with corresponding master data 160 which may be stored in a data store 170 and thereby the plurality of backend applications 140 can be explicitly configured to be accessed from the social media application 150 via the applications access system 100. The applications access system 100 validates or verifies the authenticity of the request 154 and provides access to the plurality of backend applications 140 based on validating the request 154 with the master data 160. The master data 160 can include metadata associated with the users/user devices/social media accounts that are permitted access to a corresponding backend application of the plurality of backend applications 140. Each of the plurality of backend applications may thus upload a corresponding set of master data to the applications access system 100 to enable users access via the social media application 150. In an example, the users may be required to execute an opt-in procedure to be able to interact with the permitted backend applications.

The applications access system 100 includes a validator 102, an applications communicator 104, and the response provider 106. The validator 102 applies a plurality of validation steps to validate the request 154 and the user making the request. The validator 102 can implement validation steps that not only include verification of the request metadata with the master data 160 but may also include external data sources 190 in the public domain accessible via the Internet. More particularly, the validator 102 ensures that the request 154 is made by a user via an authentic social media account that is permitted access to the corresponding backend application for which the access is sought. The validator 102 can implement artificial intelligence (AI) based validation services using authentic websites, news sites, etc., for validating the request 154. Different validations can be implemented by the validator 102 for different types of data access requests. For example, each data access request for adding new data, updating existing data, or deleting the information is validated afresh by the validator 102.

The applications communicator 104 provides the communication interface that enables the plurality of backend applications 140 to be accessible via the social media application 150. In an example, the plurality of backend applications 140 can be associated with a plurality of communication interfaces 142 so that each backend application has a respective communication interface (e.g., communication interface 1, communication interface 2, . . . communication interface n). The communication interface of a backend application enables the backend application to communicate with the users via the social media application 150. When the user is authorized to access a particular backend application, the user's information such as the user credentials may be communicated to the applications access system 100 in the master data 160. Upon verifying the user credentials, the user may be allowed to access the particular backend application via the communication interface according to the mechanisms detailed herein.

A validated request to a backend application from an authorized user is processed by the applications communicator 104 for retrieving, updating, or deleting the data per the request 154. In an example, the applications communicator 104 can be provided access to application programming interfaces (APIs) of the backend applications 140 to carry out the tasks from the validated requests. The applications communicator 104 can select one of the plurality of backend applications 140 based at least one the request 154. If the social media account is authorized to access multiple backend applications then the specific application accessed by the user is selected to service the request 154. Referring to the example of an invoice processing application, the request 154 may pertain to submission/ingestion of documents/invoices to a backend application e.g., an invoice manager for approval of the invoices, or an inquiry regarding the processing status of an invoice, discounts, suggestions, a request for an account detail update, etc. For example, if the request 154 pertains to an inquiry issued to a channel established for a helpdesk application, then the helpdesk application may be selected. The request for help can be handled by one or more of a machine learning (ML) based chat agent and a live agent (i.e., a human agent), wherein the request for help is initially provided to the ML-based chat agent included in the plurality of backend applications 140 and later the request for help can be forwarded to the live agent based on user input after receiving a response from the ML-based chat agent. The request 154 can also be used to retrieve search results associated with a search query from a corresponding backend application of the plurality of backend applications 140. The request 154 can be made to access frequently asked questions (FAQs) on one or more backend applications.

Upon completing the necessary processing for the request 154, the applications access system 100 may or may not return any data from the corresponding backend application depending on the request 154 being validated. If any data is to be returned, the response provider 106 receives the data from the applications communicator 104 and may enable the display of such data on the social media UI 152. For example, if an invoice is submitted for processing by the request 154 via the social media UI 152, the applications access system 100 may return an acknowledgment without any specific data. However, if the request 154 pertains to specific information regarding updating account information, the applications access system 100 may be required to return the updated information. In providing sensitive data such as account information, the applications access system 100 ensures protection of the sensitive data by implementing various procedures to occlude or prevent transmission of the sensitive data via the social media application 150. The response provider 106 enables AI-based masked communications thereby masking sensitive information while providing representative data in a response 156 to the request 154. The response 156 with the sensitive data occluded can be displayed on the social media UI 152.

Figure 2A:
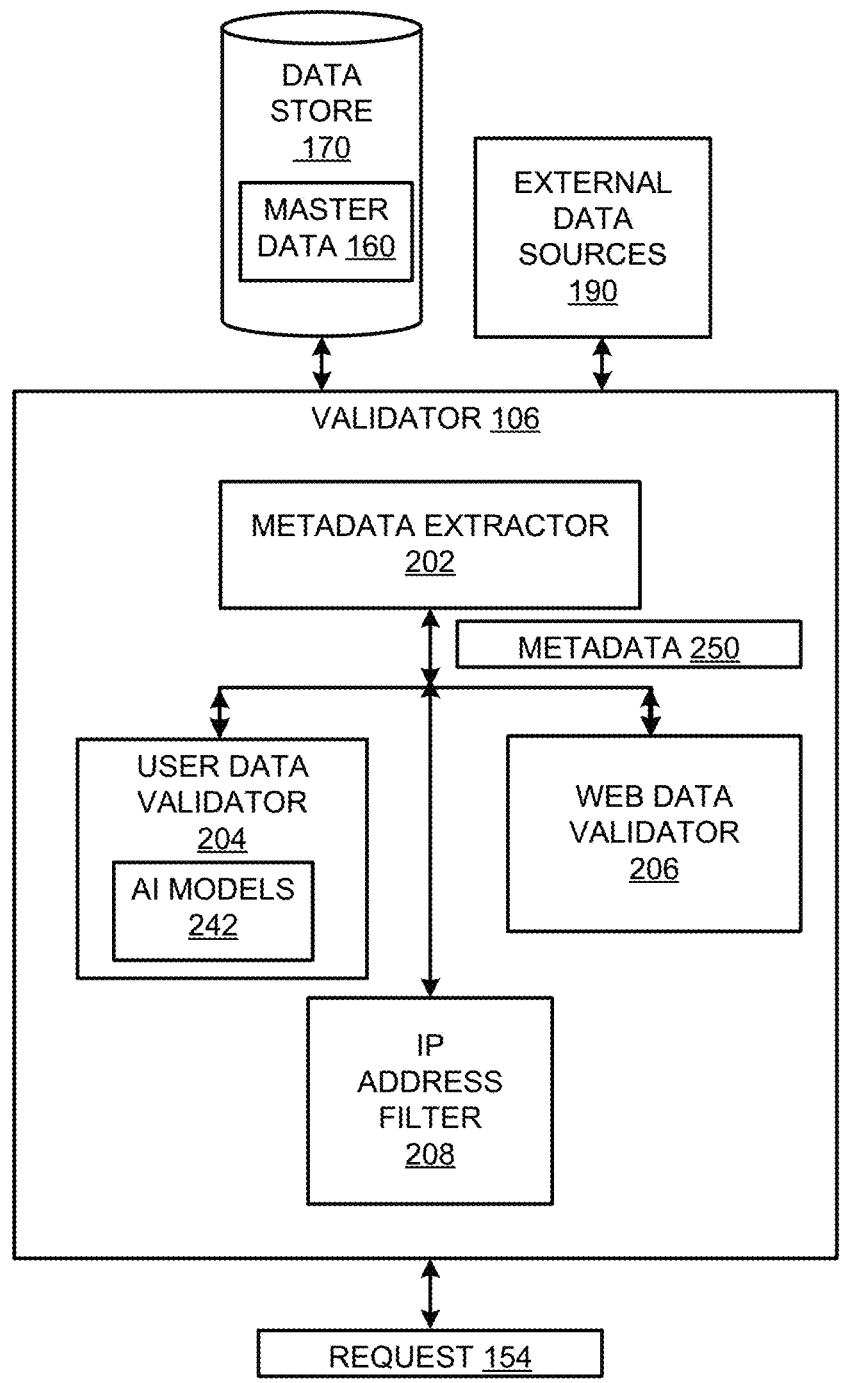
FIG. 2A shows a block diagram of a validator in accordance with the examples disclosed herein.

FIG. 2A shows a block diagram of the validator 102 in accordance with the examples disclosed herein. The validator 102 includes a metadata extractor 202, user data validator 204, a web data validator, and an IP address filter 208. In an example, the metadata extractor 202 extracts metadata 250 from one or more of the request 154 and the social media application 150. The metadata 250 can include but is not limited to the date and time at which the request 154 is received, the geographic location of the user device 130 issuing the request 154, user information, such as the unique identifier of the user device 130, a username used on the social media application 150, the handler information, etc. The applications access system 100 can also be updated regularly with the master data 160 from one or more of the plurality of backend applications 140. In an example, the master data 160 may not only originate from the plurality of backend applications 140 but may also be added to or updated by the applications access system 100 based at least on the information extracted from the requests that are routinely received from the users via a social media application 150. In addition to the metadata regarding the authorized users, the master data 160 may also include general information regarding the entity authorizing the users to access the backend application(s) such as but not limited to, the official website, the general working hours, the various official social media accounts and handlers of the authorizing entity, the various official network addresses, etc.

In an example, the user data validator 204 can include Artificial Intelligence (AI) models 242 for identifying user data such as usernames of social media users permitted to access the backend application(s). In an example, the AI models 242 can be used to compare the metadata extracted from the request 154 with the information in the master data 160. For example, one of the AI models 242 such as the classifier can be trained to identify specific authenticated user names, whereas another one of the AI models 242 can be trained to identify particular social media handlers. For example, an Artificial Intelligency (AI) model for identifying official social media handles can verify that the social media account issuing the request 154 is an official social media account of an entity/user associated with the request and an approved account with permission to access that particular backend application. The user data validator 204 can also verify other extracted metadata by comparing with the master data 160 such as the length of time the social media account that issues the request 154 has been in existence, if there has been any other/prior conversation related to the request 154 if the time of issuance of the request 154 is within the normal range of operational hours of the social media account issuing the request 154, etc.

As mentioned herein, the applications access system 100 is configured with the web data validator 206 to validate the request 154 by extracting information from the external data sources 190 in addition to the master data 160. In an example, the information obtained from the external data sources 190 can be another component that is added to the master data 160 by the web data validator 206. This can be necessary when the master data 160 has changed and has not yet been updated by the corresponding backend application. For example, if a new location is opened by the authorized entity associated with the backend application, and it was not yet updated to the master data 160, while new location data is available on the Internet on an official website associated with the entity, such data may be identified by the web data validator 206 and updated to the master data 160. Similarly, other third-party websites that are known to include accurate information can also be accessed by the web data validator 206 for validation of the request 154. Therefore, a request originating at the new location may be permitted access to the corresponding backend application even if it is not initially included in the master data 160. In an example, the web data validator 206 can implement web scraping techniques to obtain information from the external data sources 190.

The IP address filter 208 also employs the external data sources 190 for validating requests. In an example, the external data sources 190 can include subscription websites or IP addresses lookup networks that provide dark web IP data. The IP address associated with the request 154 can be compared with the dark web IP address range to further determine the authenticity of the request 154. Upon validating the request 154 by each of the user data validator 204, the web data validator 206, and the IP address filter 208, the backend application associated with the request 154 may be made accessible for interaction to the user via the social media UI 152.

Figure 2B:
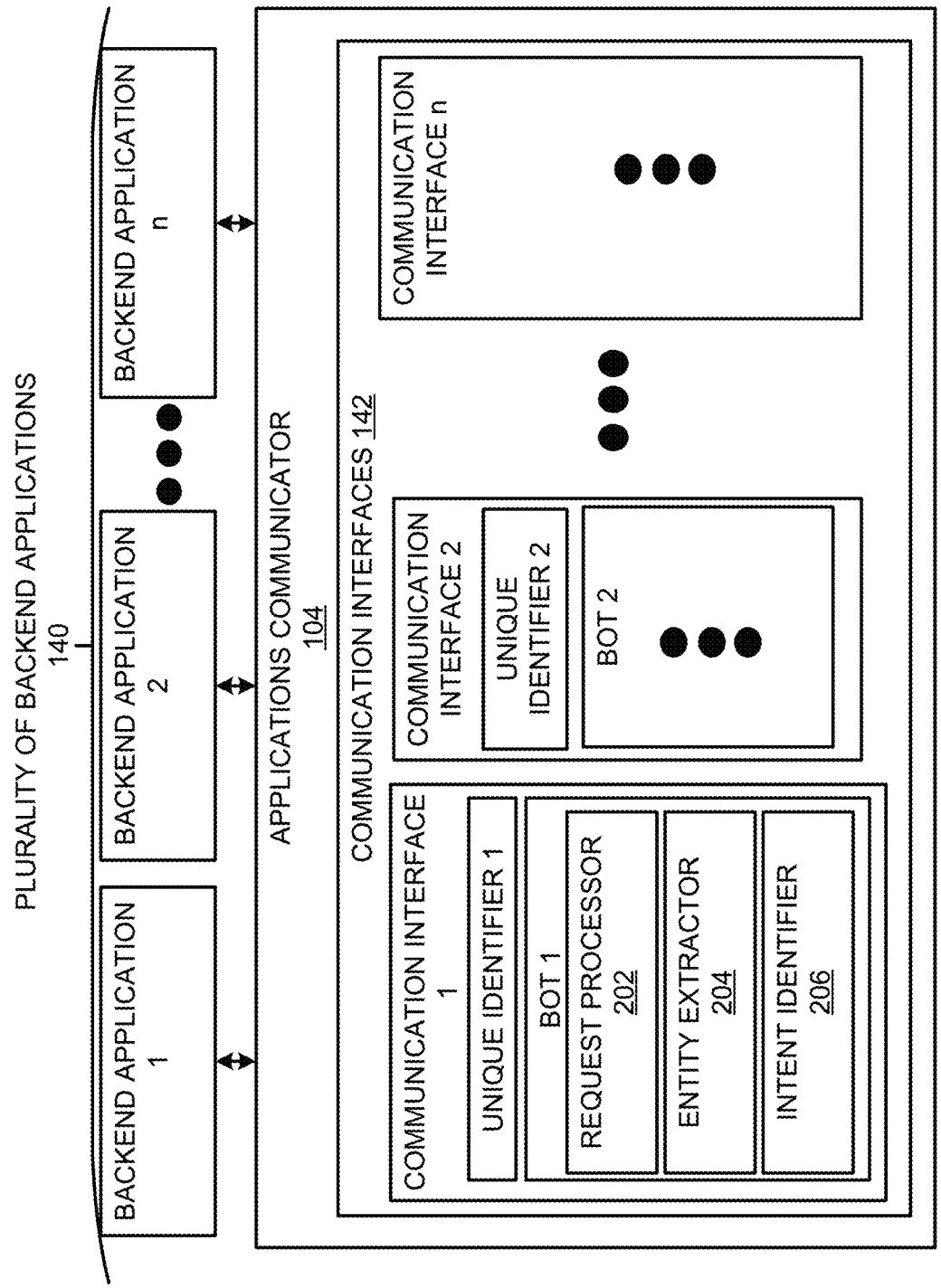
FIG. 2B shows a block diagram of an applications communicator according to an example.

FIG. 2B shows a block diagram of the applications communicator 104 according to an example. The applications communicator 104 includes the plurality of communication interfaces 142 e.g., communication interface 1, communication interface 2, ..., communication interface n, that enable the plurality of backend applications 140 to interact with the users via the social media application 150. The description below will be discussed with respect to communication interface 1 corresponding to the backend application 1, however, it can be appreciated that a similar description applies to the remaining ones of the plurality of applications 140 and their corresponding plurality of communication interfaces 142. In an example, the communication interface 1 includes a unique identifier 1 (e.g., a telephone number) that can be programmatically accessed to enable access to the backend application via the social media UI 152. By way of illustration and not limitation, tools such as Twilio® may be used for securing the unique identifiers for the plurality of backend applications 140. Whenever a user is authorized to interact with the backend application 1, the unique identifier 1 can be communicated to the user so that the unique identifier 1 can be used to access the backend application 1 via the social media application 140. In an example, the unique identifier 1 can be associated with a corresponding bot 1 which is also included in the communication interface 1. Therefore, the bot 1 provides the gateway that facilitates user access to the backend application 1.

Bots are software programs that can be programmed to perform certain automated tasks. In an example, bot 1 can include a request processor 202, an entity extractor 204, and an intent identifier 206. When the request 154 in natural language is received, it is processed, e.g., parsed and tokenized by the request processor 202. Entities are extracted from the tokens by the entity extractor 204. Natural Language Processing (NLP) techniques can be implemented to identify and classify the intent conveyed in the request 154. The entities along with the intent obtained from the request 154 may be provided to the backend application 1 by the bot to enable the backend application 1 to respond to the request 154. In an example, the response provided by the backend application 1 may be framed as a natural language response by the bot 1 before being transmitted for display on the social media UI 142 as the response 156.

Figure 3:
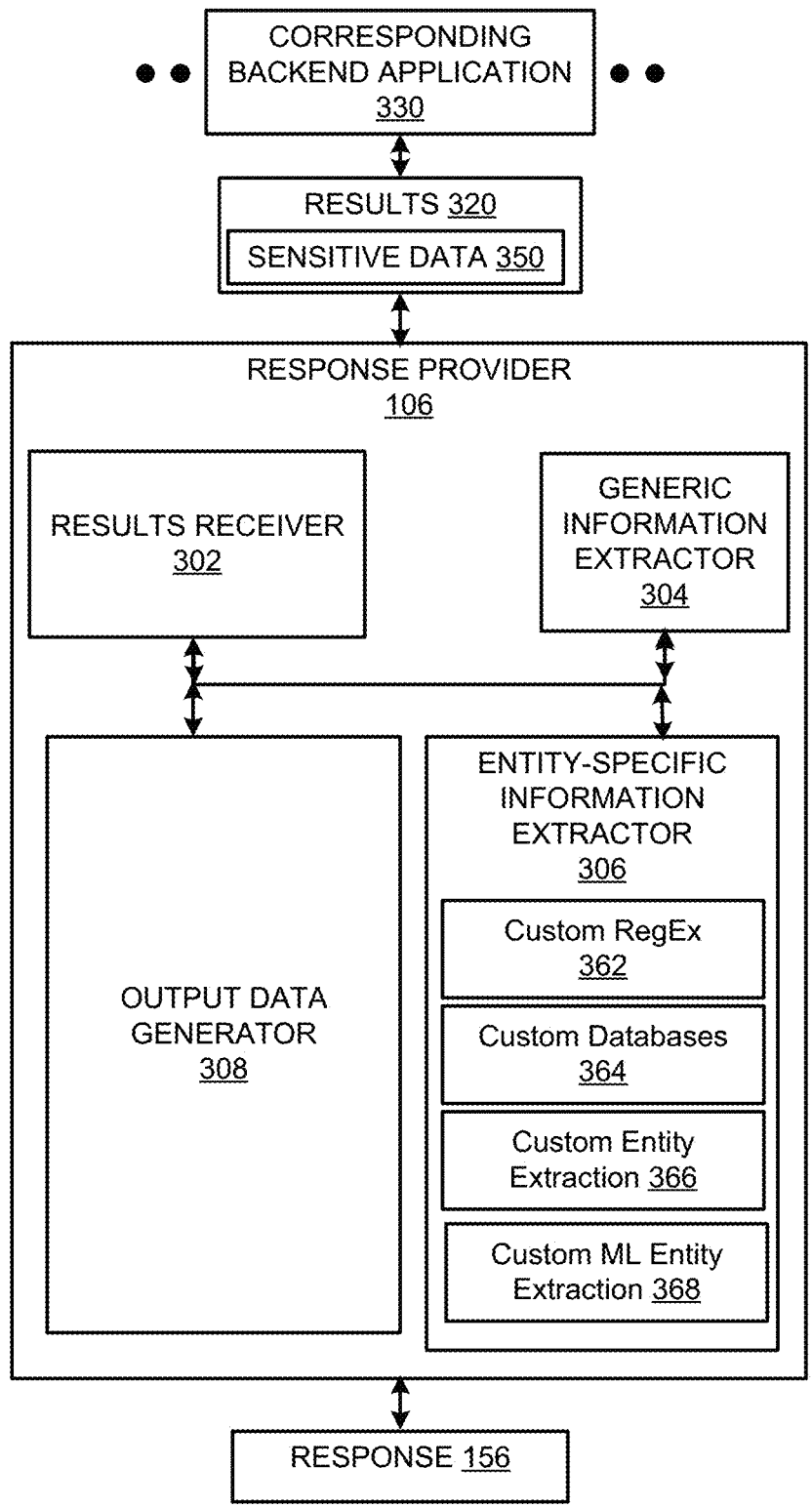
FIG. 3 shows a block diagram of a response provider in accordance with the examples disclosed herein.

FIG. 3 shows a block diagram of the response provider 106 in accordance with the examples disclosed herein. The response provider 106 includes a results receiver 302, a generic information extractor 304, an entity-specific information extractor 306, and an output data generator 308. The results 320 from providing a validated request to a corresponding backend application 330 of the plurality of backend applications 140 are received by the applications communicator 104 and made accessible to the results receiver 302 of the response provider 106. The response provider 106 further treats the results 320 to ensure that no sensitive data is transmitted to the social media application 150 in the response 156. The generic information extractor 304 can use techniques from one or more of the plurality of backend applications 140 to identify generic information from the results 320 such as locations, dates, times, common nouns, objects, entities, etc. The generic information extractor 304 can employ regular expressions (RegEx), dictionaries, pre-trained database models, named entity recognition (NER) techniques, etc. for the generic information extraction.

The generic information extracted by the generic information extractor 304, can be provided to the entity-specific information extractor 306. The entity-specific information extractor 306 can be configured to identify sensitive data 350 in the results 320. Sensitive data 350 can include any data that any owner entity having ownership/authority of the corresponding backend application 330 desires to keep from being transmitted to the social media application 150. In an example, the entity-specific information extractor 306 can implement different techniques to identify different types of sensitive data 350. Such techniques can include but are not limited to, Custom RegEx 362 for domain-specific entities with particular formats such as customer IDs, etc., maintaining custom databases 364 of entity products, services, etc., custom entity extraction 366 using, for example, open-source entity extraction methods for identifying specific names and address e.g., foreign names and addresses, etc., and custom machine learning (ML) entity extraction (e.g., product names, medication, formulae, etc.).

The output data generator 308 generates the response 156 by suppressing transmission of sensitive data 350 to the social media application 150 by implementing various data substitution techniques such as masking, redaction, etc. The final result set with the sensitive data 350 obscured or prevented from being transmitted to the social media application 150 is provided as the response 156 for display on the social media UI 152. In an example, the results 320 may be provided to a corresponding bot associated with the corresponding backend application 330. The bot may implement the data substitution procedures and provide the response 156 in natural language with the sensitive data suppressed in the display.

Figure 4A:
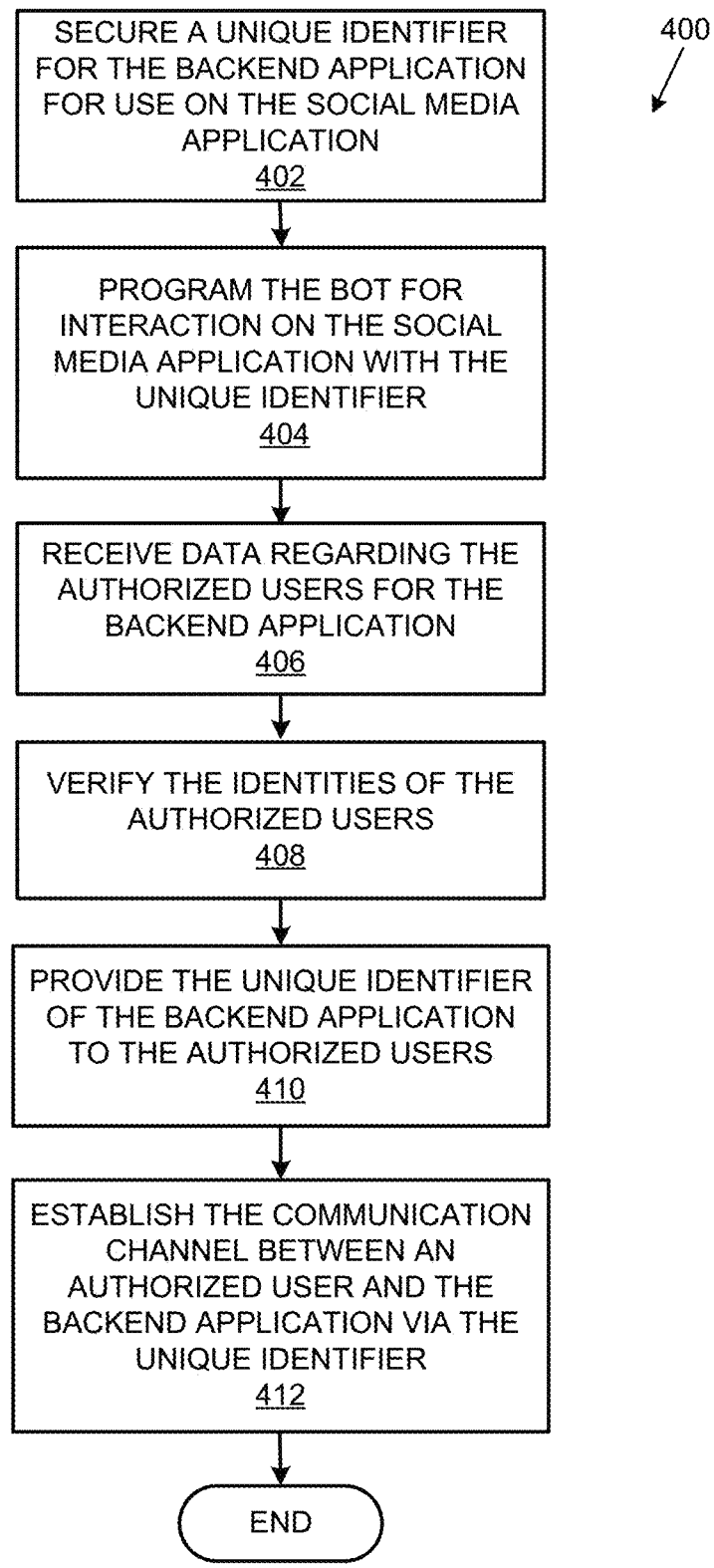
FIG. 4A shows a flowchart that details a method of providing access to different backend applications via a social media application in accordance with the examples disclosed herein.

FIG. 4A shows a flowchart 400 that details a method of enabling user access to one or more of the plurality of backend applications 140 according to the examples disclosed herein. When it is determined that one of the plurality of backend application 140 e.g., the backend application 1 is to be made accessible via the social media application 150, unique identifier e.g., unique identifier 1 is initially secured at 402 for the backend application 1 for registration on the social media platform 150. In an example, the unique identifier 1 may be a telephone number that can be programmatically accessed to establish a channel of communication for the users with the backend application 1. Of course, it can be appreciated that the unique identifier is not limited to a telephone number and that any unique identifier that is accepted by a particular social media platform may be secured. At 404, a bot e.g., bot 1 can be programmed with the unique identifier 1 so that the bot 1 can interact with authorized users on the social media platform 150. The unique identifier 1 is therefore programmatically associated with bot 1 so that any messages received on a channel established for the backend application 1 on the social media application are routed to bot 1.

Figure 4B:
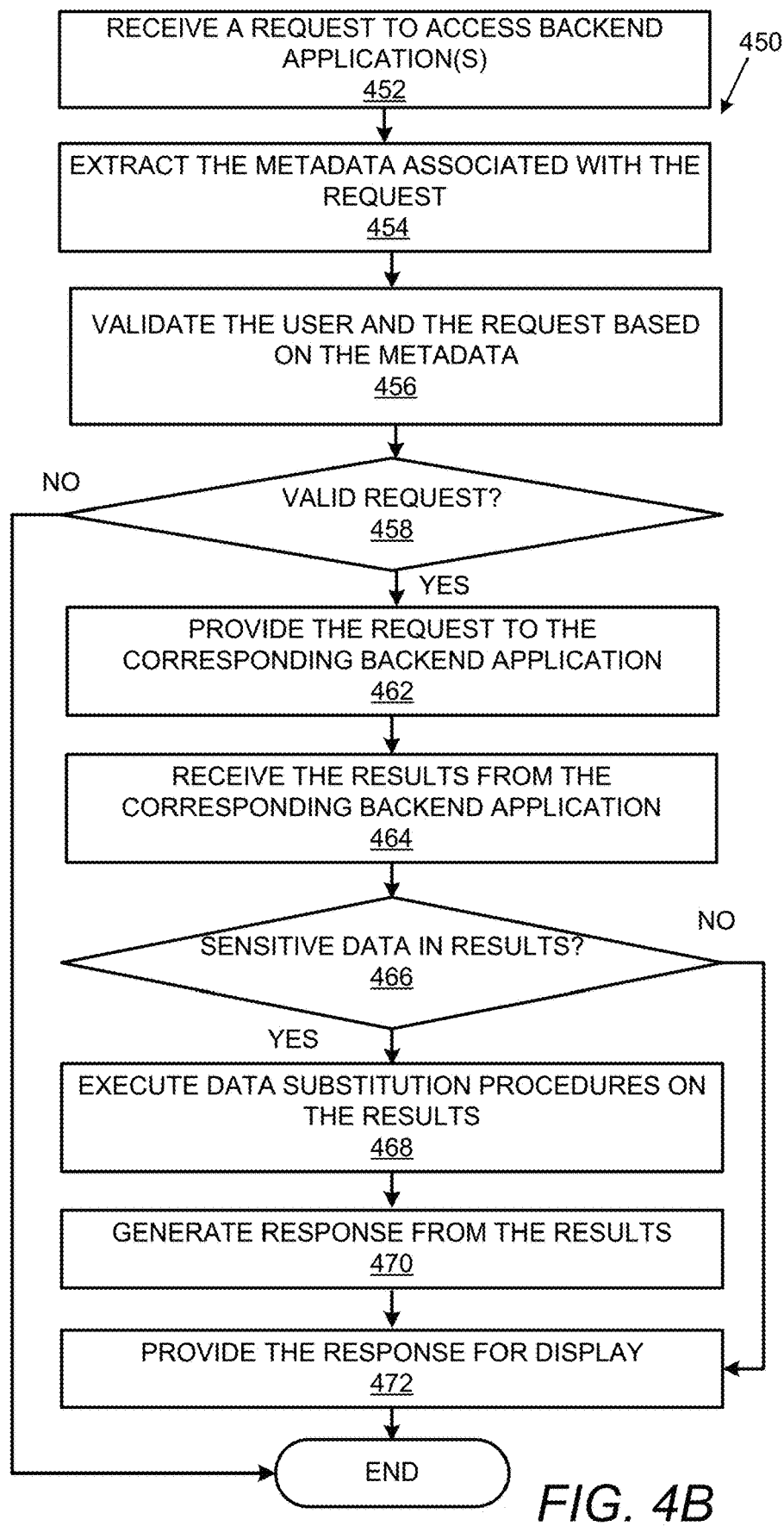
FIG. 4B shows a flowchart that details a method of processing a user request received via a social media application for a backend application in accordance with the examples disclosed herein.

At 406, the data regarding users authorized to access the backend application 1 via the social media application 150 can be received for example, via the master data 160. In an example, the data received at 406 can include the unique identifiers of the authorized users on the social media platform. At 408, the identities of the authorized users on the social media application 150 are verified. Various identity verification methods such as using one-time passwords (OTPs) via another communication channel such as a small messaging service (SMS) or an official email may be used for identity verification at 408. Upon verifying the authorized users' identities, the unique identifier 1 is provided to the authorized users at 410 in order to establish the communication channel between each authorized user and the bot 1 on the social media application 150. At 412, the authorized user is allowed to add the bot 1 via the unique identifier 1 as a contact on the social media application 150 to interact with the backend application FIG. 4B shows a flowchart 450 that details a method of enabling user interactions with one of the plurality of backend applications 140 via a social media platform by the applications access system 100 in accordance with the examples disclosed herein. The method begins at 452, wherein the request 154 for access to a backend application of the plurality of backend applications 145 is received. The request 154 can be submitted to the applications access system 100 via the social media UI 152. In an example, the request 154 can be issued in a natural language by the user. At 454, the metadata 250 associated with the request 154 is extracted. The metadata 250 can be extracted by parsing, tokenizing, and executing other natural language processing (NLP) techniques on the request 154. The metadata 250 can include not only the textual content of the request 154 but also other information associated with the request 154, such as, the social media account through which the request 154 was received, the IP address, and the geographic location associated with the request 154, the date and time at which the request 154 was received, etc. Regarding the social media account associated with the request 154, information such as whether the social media account is approved, the number of days since the social media account was active, whether the social media account has any prior conversations with the applications access system 100 related/unrelated to the request 154, etc. can be extracted as the metadata 250. In an example, the social media verification APIs can be employed to gather metadata 250 to validate the request 154.

At 456, the metadata 250 that is extracted can be used to validate the user and the request 154 via a plurality of validation steps. For example, the social media account information can be compared with the authorized user information in the master data 160 to determine if the user/user device issuing the request 154 is permitted access to the particular backend application sought by the request 154 and if the type of access being requested is permitted. The request 154 is validated by comparing the metadata 250 with the master data 160 as detailed further infra. It is determined at 458 if the request is valid. If it is determined at 458, that the request is not valid, then the request 154 for access is denied and the method is terminated on the end block.

If it is determined at 458 that the request 154 is valid and that the user is permitted to access the corresponding backend application 330 associated with the request 154 and execute the desired operations or retrieve the desired information, the method moves to 462 to allow the request 154 to be processed and the results from the processing (i.e., the entities and the intents) to proceed to the corresponding backend application. At 464, the raw data or results 320 from the corresponding backend application 330, are received. At 466, it is determined if any sensitive data 350 is included in the results 320. Examples of sensitive data 350 can include data that is specific to the user/entity associated with the corresponding backend application 330 or confidential data of the entity such as customer IDs, customer information such as contact numbers, addresses, account numbers, invoice amounts, etc. Sensitive data 350 can also include data from custom databases such as products, services, marketing information, etc.

If no sensitive data is detected at 466, then the results 320 can be provided for display at 472 on the social media UI 152 by transmitting the results 320 as the response 156 to the social media application 150. If it is determined at 466 that sensitive data 350 is included in the results 320, then the results 320 are further treated at 468 with data substitution procedures detailed herein to prevent the sensitive data 350 from being displayed to the user. The response 156 is generated at 470 to include the results 320 with the sensitive data occluded. The method returns to 472 to provide the response 156 for display on the social media UI 152.

FIG. 5 shows a flowchart 500 that details the plurality of validation steps executed to validate the request 154 in accordance with the examples disclosed herein. At 502, master data validation of the request 154 is executed, i.e., the request 154 is initially validated at 502 by comparing the metadata 250 extracted from the request 154 and/or the social media application 150 with the master data 160. As mentioned herein, metadata 250 including but not limited to, the geographic location associated with the request 154, information regarding the user account issuing the request 154, age whether the user account is an official account permitted access to the corresponding backend application 330, the time the user account was opened with the socially application 150, the frequency of usage of the user account to access the corresponding backend application 330, the existence of prior conversations related to the request 154, etc. can be compared with the master data 160 during the master data validation. It is determined at 504 if the request 154 was cleared or validated based on the master data check executed at 502. If the request 154 faded the master data check, the method moves to 520 wherein the request 154 is rejected.

If the request 154 was validated on the master data check at 502, the method moves to 506, wherein information validation of the request 154 is executed. The information validation can involve using techniques such as web scraping, etc. to gather information from the official websites or other informational sources, such as third-party data from subscription databases, etc. in the public domain. At 508, information from the metadata 250 can be compared with the information gathered at 506, It is determined at 510 if the request 154 is valid based on the comparison at 508, If it is determined at 510 that the request 154 is invalid, the method moves to 520 wherein the request 154 is rejected.

If the request 154 was found valid at 510, the method moves to 512, wherein the IP address from which the request 154 was issued is identified from the metadata 250. The IP address of the request 154 is compared with network names/dark web ranges at 514. In an example, third-party data regarding the IP address lookup for the dark web ranges can be used for the check at 514, It is determined at 516 if the request is valid based on finding a match for the IP address of the request 154 with one or more of the IP addresses from the dark web ranges. If there is a match, it is determined that the request 154 was invalid and accordingly is rejected at 520. If there is no match between the IP address of the request 154 and the IP address lookup, the method moves to 518 to allow the request 154 access to the corresponding backend application 330.

Figure 6:
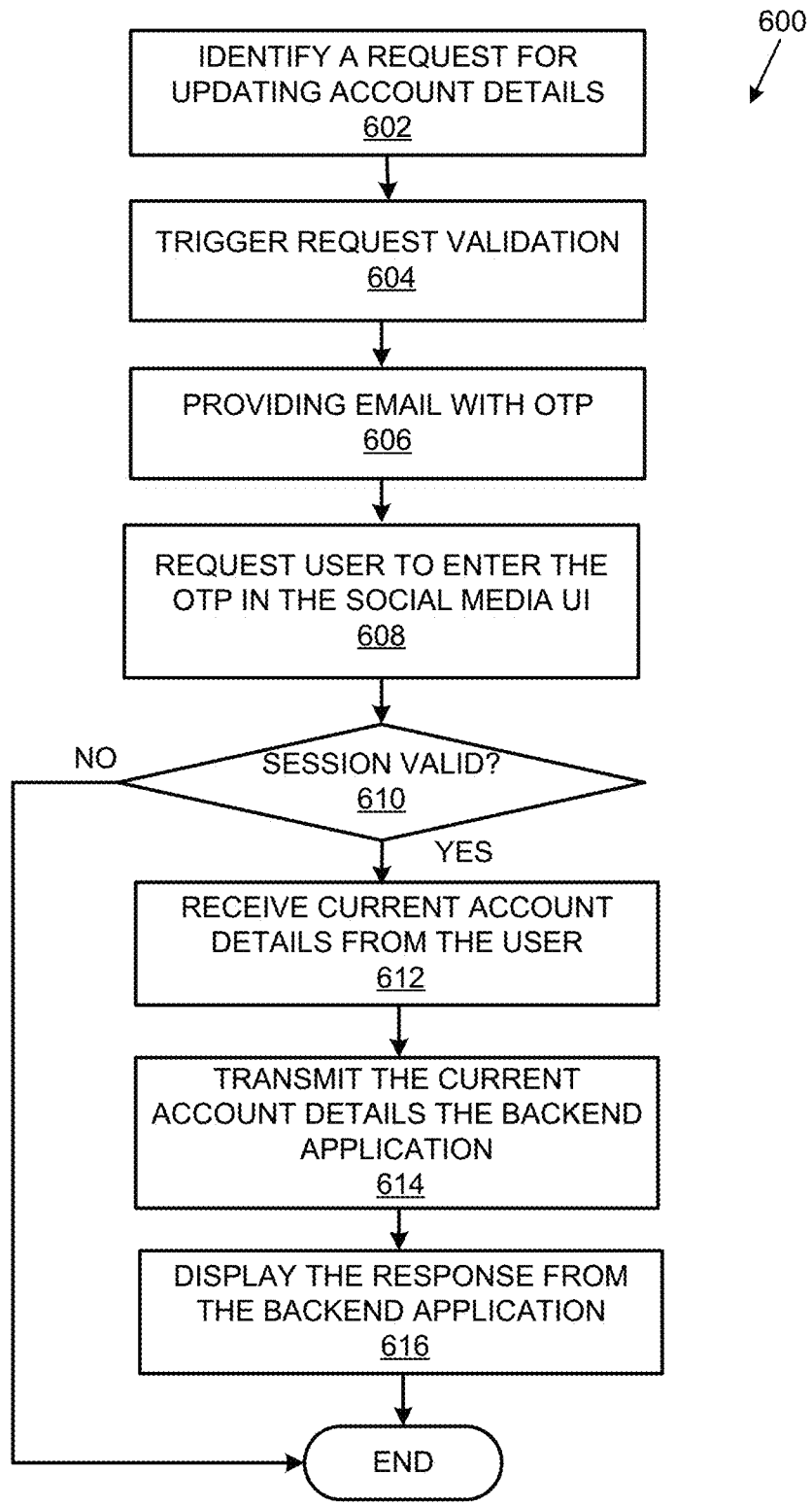
FIG. 6 shows a flowchart that details a method of interacting with the corresponding backend application via a social media user interface (UI) accordance with the examples disclosed herein.

FIG. 6 shows a flowchart that details a method of interacting with the corresponding backend application 330 via the social media UI 152 in accordance with the examples disclosed herein. The method begins at 602 wherein a request for updating account details is identified. The further authentication in terms of request validation is triggered at 604 and at block 606, an email with a one-tune password (OTP) is provided to the requester at the email address of record for the requester. At 608, the user is requested to enter the OTP emailed to the user in the conversation taking place in the social media UI. The session is, therefore, determined to be valid or invalid at 610 based on the comparison of the OTP entered the conversation with the actual OTP emailed to the user. If the session is determined to be invalid at 610, the method is terminated on the end block. If the session is determined to be valid at 610, the current account details are received at 612 from the user via the social media UI 152. At 614, the current account details provided by the user are transmitted to the corresponding backend application 330 and a response from the corresponding backend application 330 can be displayed to the user at 616 after analyzing for sensitive data and execution of the necessary data substitution procedures. The response from the corresponding backend application 330 may depend on the successful processing of the current account details provided by the user. If a matching account was found, the response from the backend application displayed to the user at 616 enables the user to make any necessary changes/updates to the account details by providing newer details. If a matching account is not found, the response from the corresponding backend application 330 displayed to the user at 616 can request the user to enter the correct account details. In an example, the user may be provided with a predetermined number of tries to enter the correct account details before the method terminates on the end block.

Figure 7:
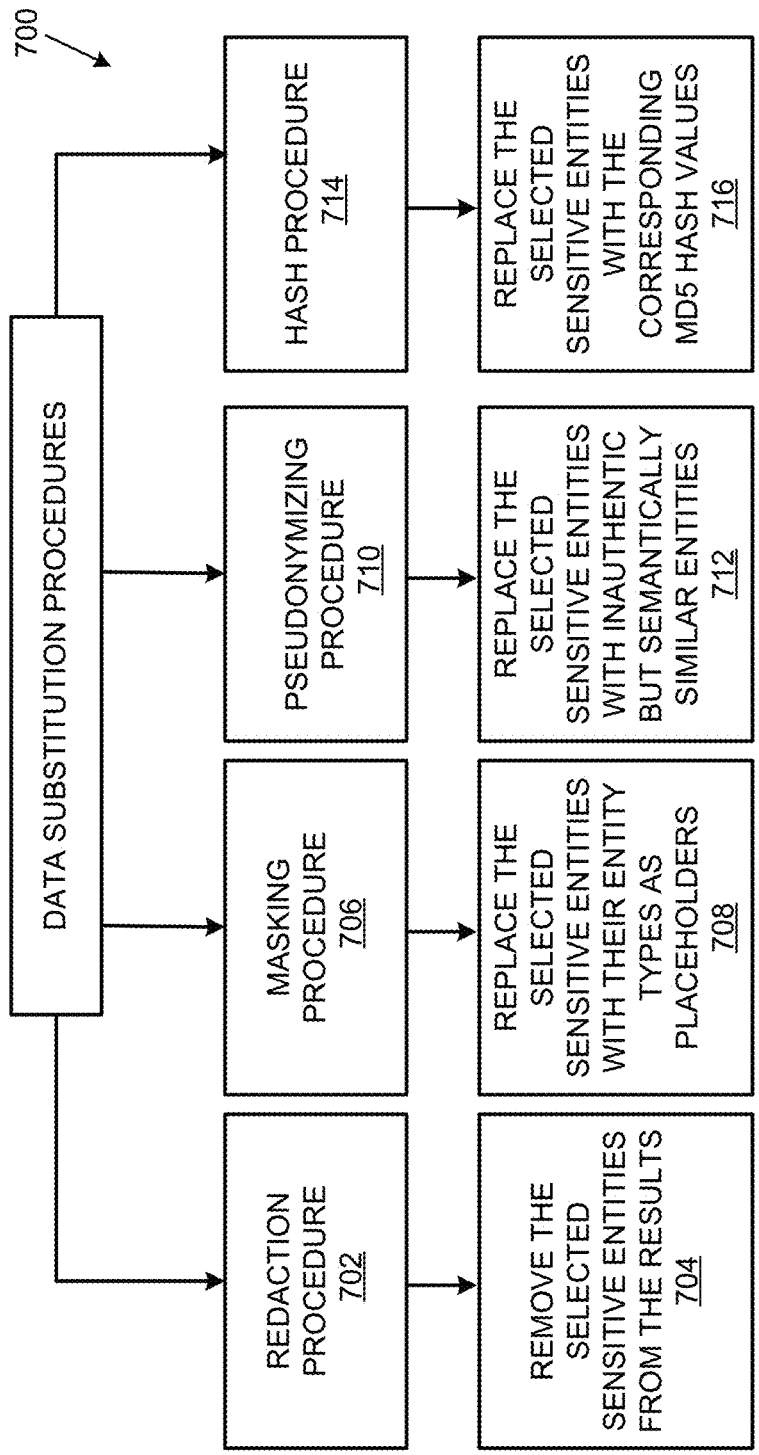
FIG. 7 shows a flowchart that details the different data substitution procedures in accordance with the examples disclosed herein.

FIG. 7 shows a flowchart 700 that details the different data substitution procedures implemented by the applications access system 100 in accordance with examples disclosed herein In an example, the applications access system 100 may be programmatically configured to implement a particular type of data substitution procedure for the specific kind of sensitive data from the results 320. If it is determined at 702 that a redaction procedure is to be executed, then certain selected sensitive entities are removed at 704 from the results 320 to produce the response 156. If it is determined at 706 that a masking procedure is to be executed, then the selected sensitive entities are replaced with their entity types as placeholders at 708. If it is determined at 710 that a pseudonymizing procedure has to be executed, the selected sensitive data is replaced with inauthentic but semantically similar entities at 712. If at 714 it is determined that a hash procedure is to be executed, the sensitive data or selected sensitive entities are replaced with the corresponding MD5 hash values at 716.

Figure 8A:
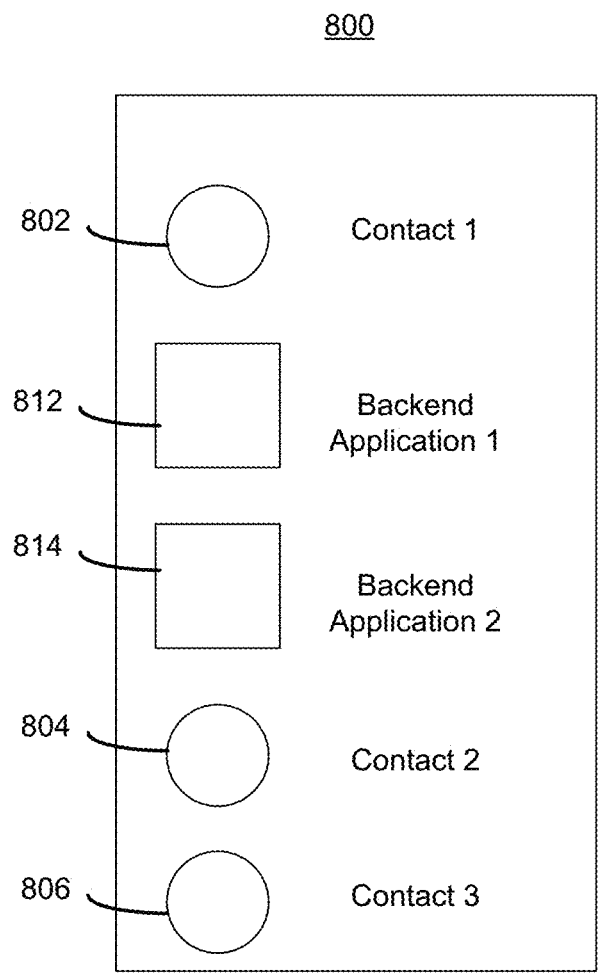
FIG. 8A shows a contacts interface displayed on the social media UI in accordance with the examples disclosed herein.

FIG. 8A shows a contacts interface 800 displayed on the social media UI 152 in accordance with the examples disclosed herein. The contacts interface 800 can be one of the many UIs put forth by the social media application 150. The contacts interface 800 includes a list of contacts 802 that the user can communicate with using the social media application 150. The list of contacts 802 can include other users of the social media application 150 e.g., 804, 806, and 808 who are in contact with the user. The list of contacts 802 also includes two backend applications 812 and 814 that the user is allowed to access via the social media application 150 as detailed herein. When the user selects one of the backend applications 812 or 814 from the contacts interface 800 to open a communication channel for interaction with the backend application on the social media application 150, validations as detailed herein may be initiated before allowing the user interaction with the selected backend application.

Figure 8B:
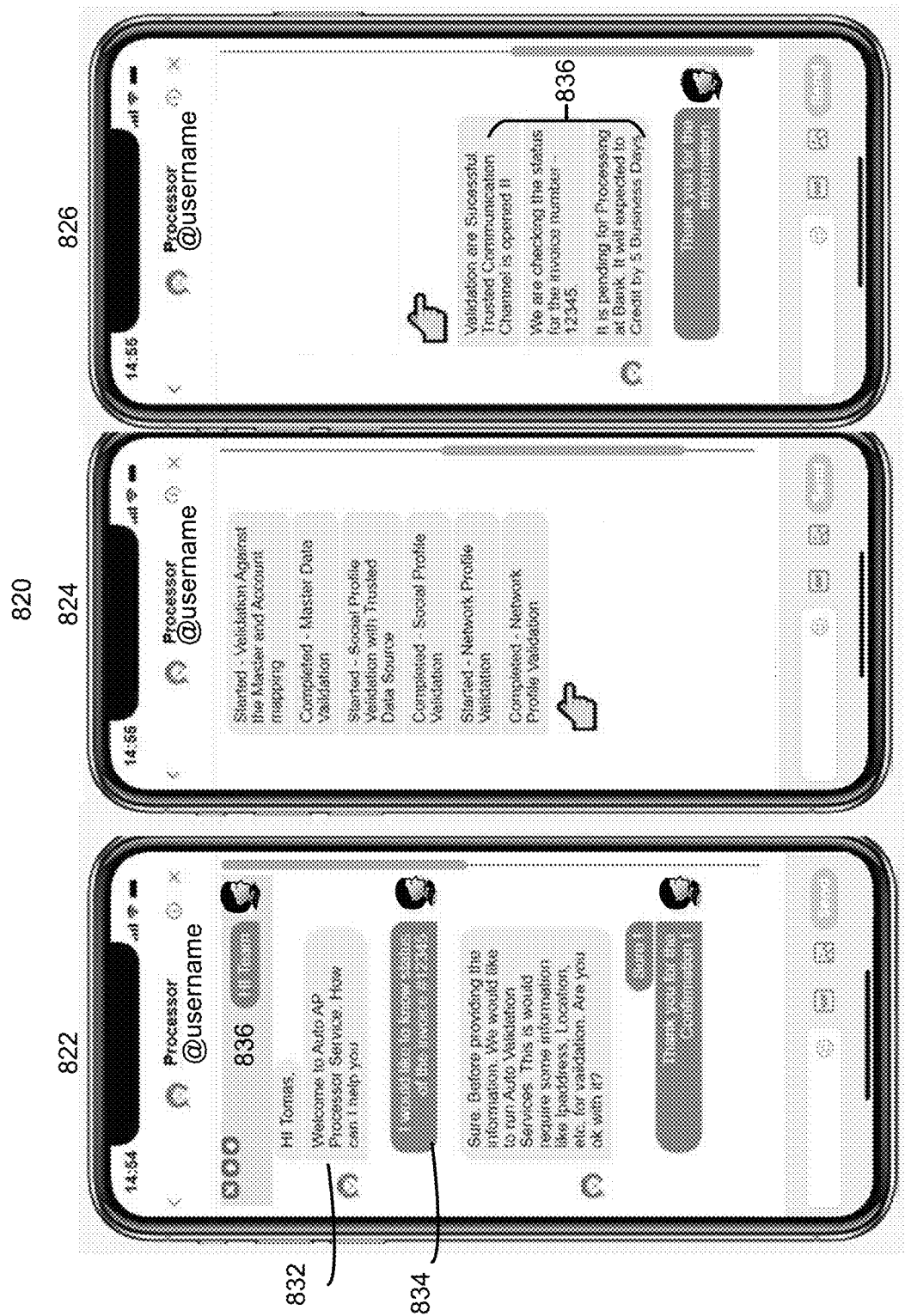
FIG. 8B shows an example of a conversational interface that shows a conversation between a user and an application according to the examples discussed herein.

FIG. 8B shows an example of a conversational interface 820 that shows a conversation between a user 'Tomas' and an application 'Processor' according to the examples discussed herein, The conversation is shown in three stages, 822, 824, and 826. In the initial stage 822, a bot associated with the 'Processor' application may receive a user greeting 836 and retrieve the user information from the user request and/or the corresponding social media application from which the user greeting 836 originated. Accordingly, the bot may frame a response 832 seeking further information from the user. Accordingly, the service request 834 is received from the user after the Processor application automatically identifies 832 the user Tomas and invites the request. Subsequently, various validations are run to confirm the user's identity and the user is updated at each stage of the validation as shown in the second stage 824. In the final stage 826, a response 836 is provided to the service request 834 after successful validation.

Figure 8C:
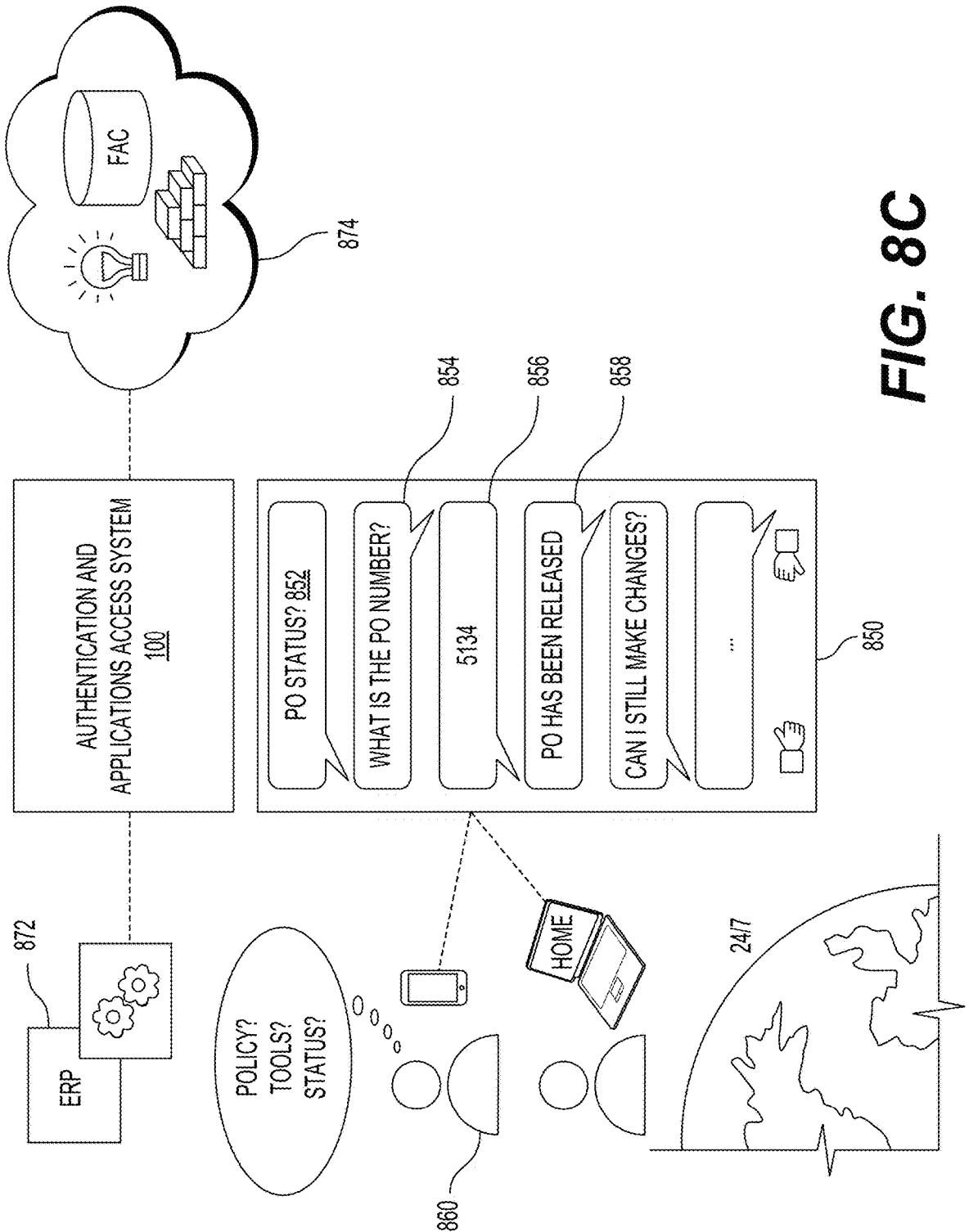
FIG. 8C shows an example conversational interface that enables a conversation between a user and one or more backend applications in accordance with the examples disclosed herein.

FIG. 8C shows another example conversational interface 850 that enables a conversation between a user and one or more backend applications in accordance with the examples disclosed herein. A user 860 can establish a channel with one or more backend applications 872, 874 to make inquiries, upload/download data, raise tickets, etc. The interaction methods established by the applications access system 100 between the users and the plurality of backend applications can include text-to-text, free dialogue/conversational flow, auto-fill based on top searches, status notifications, etc. Multiple languages can be supported by the applications access system 100. The interactions can be rated and a feedback mechanism can be established to improve the applications access system 100. In an example, a single channel or a single social media UI/conversational window can be established for each user and each backend application. The user 860 can make an initial status request 852 and the corresponding backend application 330 requests 854 further details. The user 860 provides 856 further details and the corresponding backend application responds 858 with the status information. The user 860 can continue the conversation. The conversational interface 850 thus allows the user 860 to interact with one of the plurality of backend applications 140 via social media UI in a manner similar to that which the user may employ to converse with social contacts.

Figure 9:
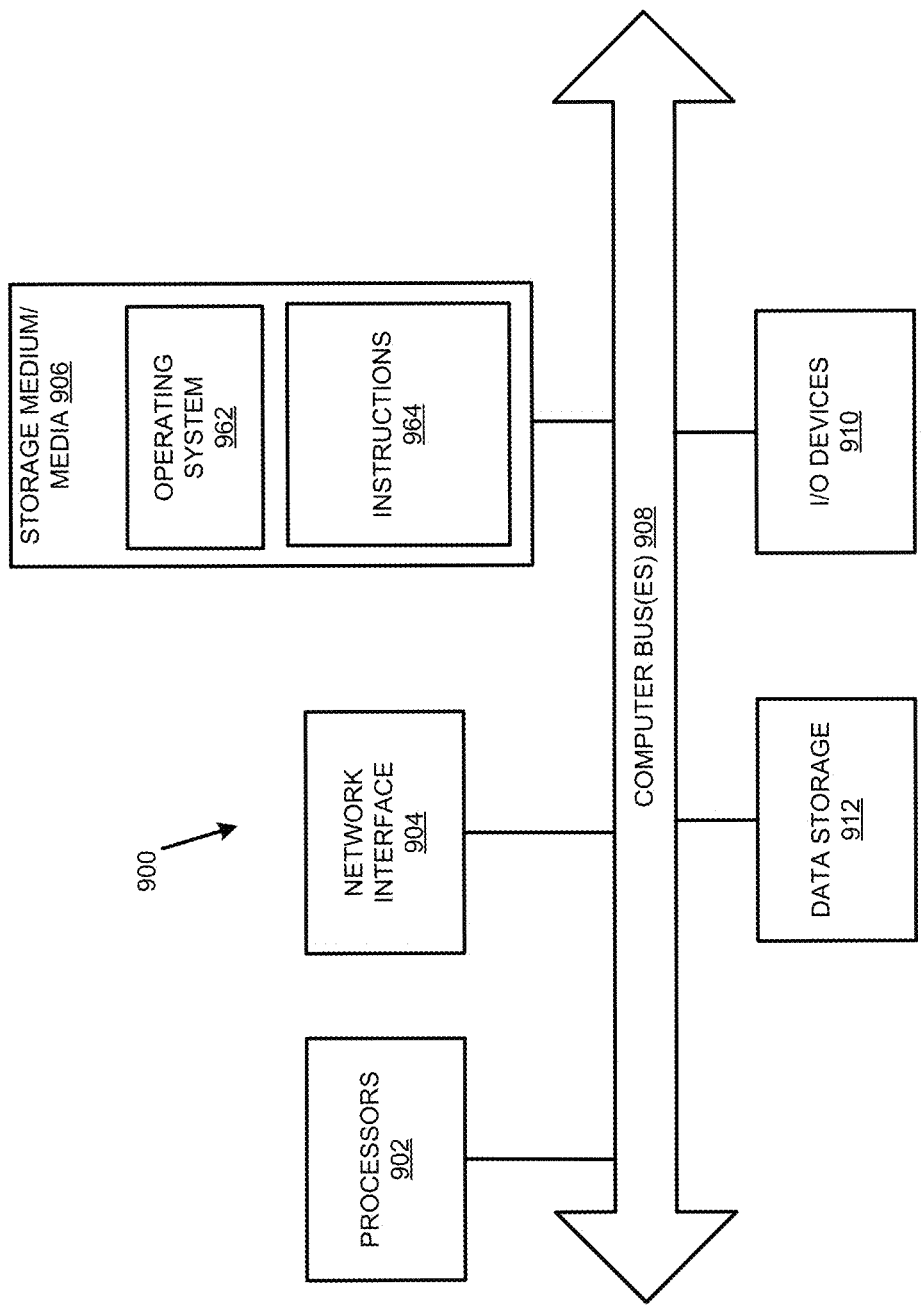
FIG. 9 illustrates a computer system that may be used to implement the applications access system in accordance with the examples disclosed herein.

FIG. 9 illustrates a computer system 900 that may be used to implement the authentication and applications access system 100 in accordance with the examples disclosed herein. More particularly, computing machines such as desktops, laptops, smartphones, tablets, and wearables which may be used to generate or access the data from the applications access system 100 may have the structure of the computer system 900. The computer system 900 may include additional components not shown and some of the process components described may be removed and/or modified. In another example, a computer system 900 can sit on external-cloud platforms such as Amazon Web Services, AZURE® cloud or internal corporate cloud computing clusters, or organizational computing resources, etc.

The computer system 900 includes processor(s) 1002, such as a central processing unit, ASIC or another type of processing circuit, input/output devices 1010, such as a display, mouse keyboard, etc., a network interface 904, such as a Local Area Network (LAN), a wireless 802.11x LAN, a 3G, 4G or 10G mobile WAN or a WiMax WAN, and a processor-readable medium 1006. Each of these components may be operatively coupled to a bus 908. The processor-readable or computer-readable medium 906 may be any suitable medium that participates in providing instructions to the processor(s) 902 for execution. For example, the processor-readable medium 1006 may be a non-transitory or non-volatile medium, such as a magnetic disk or solid-state non-volatile memory, or a volatile medium such as RAM. The instructions or modules stored on the processor-readable medium 1006 may include machine-readable instructions 964 executed by the processor(s) 902 that cause the processor(s) 902 to perform the methods and functions of the applications access system 100.

The applications access system 100 may be implemented as software or machine-readable instructions stored on a non-transitory processor-readable medium and executed by one or more processors 902. For example, the processor-readable medium 906 may store an operating system 962, such as MAC OS, MS WINDOWS, UNIX, or LINUX, and code/instructions 964 for the applications access system 100. The operating system 962 may be multi-user, multi-processing, multitasking, multithreading, real-time, and the like. For example, during runtime, the operating system 962 is running and the code for the applications access system 100 is executed by the processor(s) 902.

The computer system 900 may include a data storage 912, which may include non-volatile data storage. The data storage 912 stores any data used by the applications access system 100. The data storage 912 may be used as the data storage 170 to store the master data 160 and other data elements which are generated and/or used during the operation of the applications access system 100.

The network interface 904 connects the computer system 900 to internal systems for example, via a LAN. Also, the network interface 904 may connect the computer system 900 to the Internet. For example, the computer system 900 may connect to web browsers and other external applications and systems via the network interface 904.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

We claim:

1. An authentication and application access system, comprising:
   at least one processor;
   a non-transitory processor-readable medium storing machine-readable instructions that cause the processor to:
   enable displaying at least one backend application as a contact of a user on a user interface (UI) of a social media application;
   enable access to the at least one backend application via the UI of the social media application, wherein the at least one backend application is accessible for interactions as the contact of the user on the social media application via a unique identifier associated with the at least one backend application on the social media application;
   receive a request for access to the at least one backend application from the user via a user device;
   extract metadata from the request and the social media application;
   validate the user and the request via a plurality of validation steps,
      wherein the plurality of validation steps include:
         comparing the metadata with user authentication data provided in master data by the at least one backend application, and
         executing an artificial intelligence (AI) based validation that includes accessing third-party data sources external to the social media application;
   receive results from the at least one backend application,
      wherein the results are generated upon the execution of tasks associated with the request on the at least one backend application;
   identify sensitive data in the results received from the at least one backend application,
      wherein the sensitive data is data that is to be restricted from being transmitted to the user device via data substitution steps;
   generate a final result set by executing data substitution steps on the sensitive data in the results; and
   enable a display of the final result set on the user device in the social media UI,
      wherein the sensitive data is occluded from display on the user device via the data substitution steps.

2. The authentication and applications access system of claim 1, wherein, the at least one backend application is one of a plurality of backend applications accessible via the social media UI executed on the user device.

3. The authentication and applications access system of claim 1, wherein to enable the access to the at least one backend application, the processor is to further:
   automatically respond to communications from the user for the at least one backend application using a bot that is programmed with the unique identifier to access a communication channel established between the user and the at least one backend application on the social media application.

4. The authentication and applications access system of claim 1, wherein to execute the plurality of validation steps, the processor is to further:
   extract at least a base geographical location associated with the request;
   determine if the base geographical location of the request corresponds to a geographical location associated with the authentic user account.

5. The authentication and applications access system of claim 1, wherein to compare the metadata with the user authentication data associated with the authentic user account of the social media application, the processor is to further:
   determine if at least one piece of the metadata corresponds with the user authentication data associated the authentic user account via verification application programming interfaces (APIs) of the social media application.

6. The authentication and applications access system of claim 1, wherein to execute the plurality of validation steps, the processor is to further:

employ web scraping techniques on an authentic website including verifiable data associated with the at least one backend application; and compare the verifiable data obtained from the authentic website with the metadata extracted from the request.

7. The authentication and applications access system of claim 1, wherein to execute the plurality of validation steps, the processor is to further:

obtain an Internet Protocol (IP) address associated with the request; and determine, via IP address filtration that the IP address is not included in dark web IP addresses range.

8. The authentication and applications access system of claim 1, wherein the processor is to further:

determine if a type of data access corresponds to one of:

a request for submission of documents to the at least one backend application, a request for an account detail update on at least one backend application, a request for help that is handled by one or more of a machine learning (ML) based chat agent and a live agent, a request to retrieve search results associated with a search query to at least one backend application, and a request to access frequently asked questions (FAQs) on the at least one backend application.

9. The authentication and applications access system of claim 8, wherein the request pertains to the submission of the documents and the processor is to further:

receive an upload of the documents via the social media UI; and enable ingestion of the documents into the at least one backend application.

10. The authentication and applications access system of claim 8, wherein the request pertains to an account detail update and the processor is to further:

further authenticate the user to the one or more backend applications, via a one-time password (OTP);

receive current details of an account associated with the at least one backend application; and update the current account details on the at least one backend application to newer details supplied by the user via the social media UI upon the further authentication of the user via the OTP.

11. The authentication and applications access system of claim 8, wherein the request pertains to a request for help and the processor is to further:

provide the request for help to a Machine Learning (ML) based chat agent included in the at least one backend application; and forward the request for help to the live agent based on user input after receiving a response from the ML-based chat agent.

12. The authentication and applications access system of claim 1, wherein the data substitution steps include the sensitive data being one or more of redacted, masked, pseudonymized, and hashed.

13. The authentication and applications access system of claim 12, wherein the processor is to further:

enable display of notifications from the at least one backend application on the social media UI of the user device wherein the sensitive data in the notification is one or more of redacted, masked, psuedomyzed, and hashed.

14. A method of providing access to a plurality of backend applications including:

providing access to the plurality of backend applications to a user via a user interface (UI) of a social media application, wherein each of the plurality of backend applications is accessible for user interactions via a display as a corresponding contact of the user on the social media application and each of the plurality of backend applications is associated with a respective unique identifier on the social media application;

receiving a request for access to at least one of the plurality of backend applications from a user via a user device, and, wherein the request is provided by the user via a social media channel established between the user device and the at least one backend application on the social media application via the respective unique identifier associated with the at least one backend application;

extracting metadata from the request and the social media application;

validating the user and the request via a plurality of validation steps using the metadata;

providing the request to the at least one backend application;

receiving results from the at least one backend application, wherein the results are generated upon execution of tasks associated with the request on the at least one backend application;

identifying sensitive data including domain-specific formats, data from custom databases, specific names and addresses, and specific entities in the results received from the at least one backend application by:

identifying the domain-specific formats using custom regular expressions (RegEx), the specific names and addresses by employing custom entity extraction, and the specific entities in by employing custom machine learning (ML) models, wherein the sensitive data is data that is to be restricted from being transmitted to the user device via data substitution steps;

generating a final result set by executing data substitution steps on the sensitive data in the results; and enabling a display of the final result set on the user device in a user interface (UI) provided by the social media application, wherein the sensitive data is occluded from display on the user device via the data substitution steps.

15. The method of claim 14, wherein validating the user and the request via the plurality of validation steps further includes:

executing each of the plurality of validation steps serially for validating the user and the request, wherein a next validation step of the plurality of validation steps is executed only if the user is validated in a prior validation step.

16. A non-transitory processor-readable storage medium comprising machine-readable instructions that cause a processor to:

provide access to a plurality of backend applications to a user via a chat interface of a social media application, wherein each of the plurality of backend applications is accessible for user interactions via a display as a corresponding contact of the user on the social media application and each of the plurality of backend applications is associated with a respective unique identifier on the social media application;

receive a user request for access to at least one backend application of the plurality of backend applications via the chat interface associated with the social media application executed on a user device,
  wherein the user request is enabled via a communication channel established between the user and the at least one backend application via the respective unique identifier associated with the at least one backend application on the social media application;
extract metadata from the user request and the social media application;
validate the user and the user request via a plurality of validation steps,
  wherein the plurality of validation steps include comparing the metadata with user authentication data associated with an authentic user account of the social media application,
  wherein the authentic user account is permitted access to the at least one backend application via the social media application;
receive results from the at least one backend application,
  wherein the results are generated upon the execution of tasks associated with the user request for the at least one backend application;
identify sensitive data in the results received from the at least one backend application,
  wherein the sensitive data is data that is to be restricted from being transmitted to the user device via data substitution steps;
provide the user request to a bot associated with the at least one backend application;
extract entities from the user request by the bot;
identify an intent of the user request by the bot;
generate a final result set by executing data substitution steps on the sensitive data in the results; and
enable a display of a final result set on the user device in the chat interface,
  wherein the sensitive data is occluded from display on the user device via the data substitution steps.

17. The non-transitory processor-readable storage medium of claim 16, wherein enabling the user request further causing the processor to:
   implement the data substitution steps by the bot; and
   provide the final result set in natural language as a response to the user request by the bot via the communication channel.

* * * * *